(12) United States Patent
Kogiso

(10) Patent No.: US 6,608,457 B2
(45) Date of Patent: Aug. 19, 2003

(54) SYSTEM FOR CONTROLLING ELECTRIC POWER STEERING

(75) Inventor: Yoshinori Kogiso, Mizunami (JP)

(73) Assignee: Kayaba Industry Co., Ltd., Tokyo (JP)

( * ) Notice: Subject to any disclaimer, the term of this patent is extended or adjusted under 35 U.S.C. 154(b) by 75 days.

(21) Appl. No.: 10/006,606

(22) Filed: Nov. 8, 2001

(65) Prior Publication Data

US 2002/0060106 A1 May 23, 2002

(30) Foreign Application Priority Data

Nov. 9, 2000 (JP) ........................................ 2000-341307

(51) Int. Cl.$^7$ ................................................ B62D 5/04
(52) U.S. Cl. ......................... 318/432; 318/489; 180/443
(58) Field of Search ................................. 318/432, 433, 318/488, 489; 388/930; 180/6.44, 6.48, 6.5, 443

(56) References Cited

U.S. PATENT DOCUMENTS

| | | | |
|---|---|---|---|
| 4,653,601 A | * | 3/1987 | Nakamura et al. |
| 5,253,725 A | * | 10/1993 | Nishimoto |
| 5,469,357 A | * | 11/1995 | Nishimoto |
| 5,894,205 A | * | 4/1999 | Shimizu et al. ............. 318/432 |
| 6,122,579 A | * | 9/2000 | Collier-Hallman et al. ...................... 318/432 X |
| 6,148,948 A | * | 11/2000 | Shimizu et al. ............. 180/446 |

* cited by examiner

*Primary Examiner*—Bentsu Ro
(74) *Attorney, Agent, or Firm*—Steinberg & Raskin, P.C.

(57) ABSTRACT

A problem to be solved by the present invention is that, in a conventional system for controlling electric power steering, as the number of revolutions of a motor is increased, an assist force decreases, resulting in faulty steering response. For solving the problem, the present invention provides a system for controlling electric power steering which includes the following features: an electric motor 6; steering-torque detection means 8 for detecting steering torque; basic assist command-value determination means 10 for determining an basic assist command value on the basis of the steering torque signal; differentiation command-value determination means 11 for determining a differentiation command value on the basis of the steering torque signal; vehicle-speed detection means 9 for detecting vehicle-speed; field-current determination means 13 for determining field-current for the electric motor in response to a vehicle-speed signal; and motor-current control means 12 for controlling the electric motor 6, in which the motor-current control means 12 controls output of the electric motor 6 in response to the field-current control signal from the field-current determination means 13 and a torque-current control signal for the electric motor 6 fixed by the basic assist command value and the differentiation command value.

4 Claims, 10 Drawing Sheets

SYSTEM FOR CONTROLLING ELECTRIC POWER STEERING

BACKGROUND OF THE INVENTION

1. Field of the Invention

This invention relates to a system for controlling electric power steering.

2. Description of Related Art

FIG. 8 shows a conventional electric power steering system, and FIG. 9 is a block diagram showing the control for the electric power steering system.

As shown in FIG. 8, a pinion 2 is placed on one end of an input shaft 1 associated with a steering wheel W. A rack 5 is provided on a rod 4 having both end portions with which wheels 3R, 3L are respectively associated. The pinion 2 on the input shaft 1 engages the rack 5 on the rod 4. An electric motor 6 is associated with a reduction gear 7 having an output shaft on which a pinion is provided. The pinion also engages the rack 5 on the rod 4. A controller CT is connected to steering-torque detection means 8 for detecting steering torque acting on the input shaft 1, and vehicle-speed detection means 9 for detecting vehicle-speed.

As shown in FIG. 9, the controller CT includes basic assist-command-value determination means 10 for determining a basic assist command-value in response to a steering torque signal from the above sensor 8, and differentiation command-value determination means 11 for differentiating the steering torque signal.

The controller CT further includes a motor-current control means 12 which receives inputs of the basic assist command value from the basic assist command-value determination means 10, a differentiation command value from the differentiation command-value determination means 11, and a vehicle-speed signal from the sensor 9. The motor-current control means 12 applies motor current to the electric motor 6 in response to the basic assist command value, differentiation command value and vehicle-speed signal.

In other words, the motor-current control means 12 determines the torque current for the electric motor 6 in response to a torque-current control signal consisting of the basic assist command value and the differentiation command value. Therefore, the motor-current control means 12 applies the torque current responsive to the steering torque signal to the electric motor 6.

Further, the motor-current control means 12 multiplies the torque current by a gain in response to the vehicle-speed signal. For example, the gain is determined to increase when traveling at low speeds. For that, the torque current for the electric motor 6 can be increased when traveling at low speeds to increase the assist force.

In this way, a motor torque current according to the steering torque and vehicle-speed flows into the electric motor 6, and motor torque according to the current is generated as an assist force.

The aforementioned system for controlling the electric power steering is designed such that the electric motor 6 generates the assist force in response to the traveling speed or steering force. The control of the electric motor 6 for generating the assist force will be explained next on the basis of the electric-motor characteristics.

For this control, the electric motor 6 controls the torque current under a constant strength of a field. Typically, permanent magnets are employed to obtain the constant strength of the field. Due to the constant strength of the field, regarding the characteristics of the electric motor 6, the relationship between the number of revolutions N of the motor and motor torque T forms a straight line with a uniform gradient as shown in FIG. 10. As is clear from FIG. 10, as the number of motor-revolutions N is increased, the motor torque T decreases, and as the motor torque T is increased, the number of motor-revolutions N reduces.

On the other hand, the steering speed of the wheels 3R, 3L is proportional to the number of motor-revolutions N represented by the vertical axis of the graph in FIG. 10. The assist force of the power steering is proportional to the motor torque represented by the horizontal axis of the graph in FIG. 10.

In FIG. 10, if the motor is needed to have torque Ta for generating a constant assist force, the torque Ta can be provided up to the number of motor-revolutions Na.

However, when the steering speed is further increased, the number of motor-revolutions should exceed the value Na, and therefore the relationship changes from the point a on the graph in the direction of the arrow, resulting in a reduction in the motor torque.

The number of motor-revolutions increases with the increase of the steering speed in this way, whereas the assist force decreases, thus putting more load on the driver in operating the steering wheel, that is presenting the problem of faulty steering response.

SUMMARY OF THE INVENTION

It is an object of the present invention to provide a system for controlling electric power steering in which the strength of the field in an electric motor is controlled to control the output of the electric motor.

A system for controlling an electric power steering according to a first aspect of the present invention includes: an electric motor for generating an assist force; steering-torque detection means for detecting steering torque; basic assist command-value determination means for determining a basic assist command value on the basis of the steering torque signal; differentiation command-value determination means for determining a differentiation command value on the basis of the steering torque signal; vehicle-speed detection means for detecting vehicle-speed; field-current determination means for determining field-current for the electric motor in response to a vehicle-speed signal; and motor-current control means for controlling the electric motor, in which the motor-current control means controls the output of the electric motor in response to a field-current control signal from the field-current determination means and a torque-current control signal for the electric motor determined on the basis of the basic assist command value and the differentiation command value.

In a second aspect premising on the first aspect, motor angular-velocity detection means for detecting an angular velocity of the electric motor is further included, and the motor angular-velocity signal is input to the field-current determination means, and the field-current determination means determines field-current in response to the motor angular-velocity signal and the vehicle-speed signal.

A system for controlling an electric power steering according to a third aspect of the present invention includes: an electric motor for generating an assist force; steering-torque detection means for detecting steering torque; basic assist command-value determination means for determining an basic assist command value on the basis of the steering torque signal; differentiation command-value determination means for determining a differentiation command value on the basis of the steering torque signal; field-current determination means for determining field current for the electric motor in response to a torque-current control signal for the electric motor based on the basic assist command value and the differentiation command value; vehicle-speed detection means for detecting vehicle speed; and motor-current control means for controlling the electric motor, in which the motor-current control means controls output of the electric motor in response to a signal resulting from multiplying the torque-current control signal by gain fixed by the vehicle-speed signal, and a field-current control signal from the field-current determination means.

In a fourth aspect premising on the third aspect, motor angular-velocity detection means for detecting an angular velocity of the electric motor is further included, and the motor angular-velocity signal is input to the field-current determination means, and the field-current determination means determines field-current in response to the motor angular-velocity signal and the torque-current control signal.

According to the first aspect, the field-current determination means is provided for determining field current for the electric motor in response to the vehicle-speed signal. A field-current control signal determined in accordance with the vehicle-speed is supplied from the field-current determination means to the motor-current control means, and a differentiation command value and a basic assist command value which are determined on the basis of the steering torque signal are applied to the motor-current control means. Then, the motor-current control means controls output of the electric motor.

With such a configuration, the field-current can complement the control of the electric motor in accordance with the vehicle-speed. Specifically, this configuration allows an assist force of the power steering to increase as well as the steering response to remain unchanged when the vehicle stops or travels at low speeds, and further allows the steering response to improve as well as the assist force of the power steering to remain unchanged when the vehicle travels at high speeds.

According to the second and fourth aspects, the motor angular-velocity detection means is provided for detecting an angular velocity of the electric motor, and applies the motor angular-velocity signal to the field-current determination means. Therefore, when a steering wheel W is rapidly turned to quickly change the direction of the vehicle, it is expected that the control based on the motor angular-velocity signal will allow the assist force of the power steering to remain unchanged and the steering response to improve.

According to the third aspect, the motor-current control means receives the torque-current control signal consisting of the differentiation command value and the basic assist command value which are determined in response to the steering torque signal, and the field-current determination means is provided for determining field-current for the electric motor in response to the torque-current control signal. The field-current determination means applies the field-current control signal determined in response to the torque-current control signal to the motor-current control means, and thus the motor-current control means controls output of the electric motor.

Due to the configuration as described above, in a larger steering force, when the steering wheel is quickly and sharply turned for example, the field-current is controlled to increase the motor torque. As a result, even in a rapid steering operation, regardless of the vehicle speed, the steering response remains unchanged and a greater assist force is obtained.

DETAILED DESCRIPTION OF THE PREFERRED EMBODIMENTS

Figure 1:
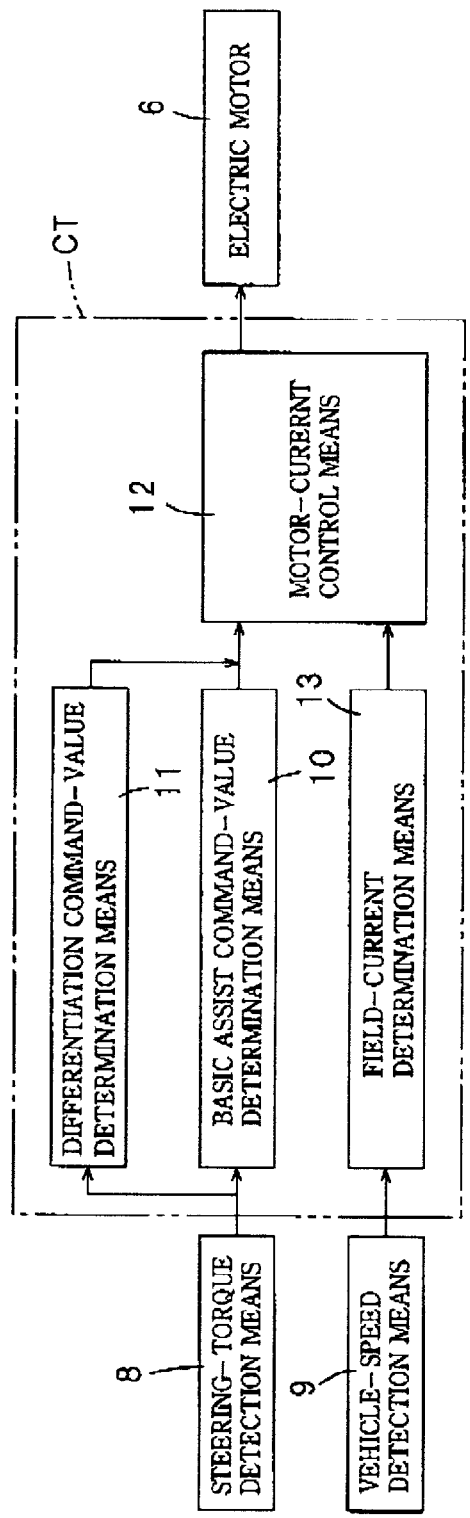
FIG. 1 is a block diagram illustrating a first embodiment according to the present invention.

FIG. 1 to FIG. 6 illustrate a first embodiment to a fourth embodiment relating to a system for controlling electric power steering according to the present invention. Components in the first to fourth embodiments the same as or similar to those in the example of prior art are designated by the same reference numerals and a detailed description is omitted.

Initially, the first embodiment will be described. FIG. 1 is a block diagram of the first embodiment. As illustrated in FIG. 1, a controller CT includes field-current determination means 13 for determining field-current for an electric motor 6 in response to a vehicle-speed signal from vehicle-speed detection means 9.

Prior to explaining about the manner of determining field-current of the electric motor 6, a description will be made of variations in the characteristics of the electric motor 6 in relation to the field-current.

Figure 2:
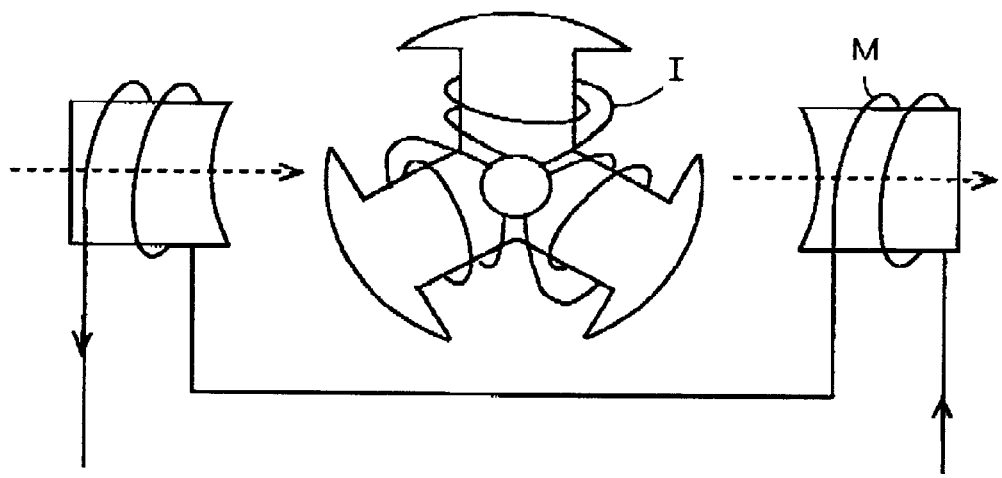
FIG. 2 is a diagram illustrating a motor with a brush.

FIG. 2 illustrates a motor with a brush serving as the electric motor 6. As illustrated in FIG. 2, the motor has a rotor on which torque-current wiring I is wound. Further, field-current wiring M is wound on a conductor for controlling the field. Electric current is fed through the field-current wiring M to generate a field in the direction indicated by the broken lines in FIG. 2. The magnitude of the field is controlled by controlling the field-current.

Figure 3:
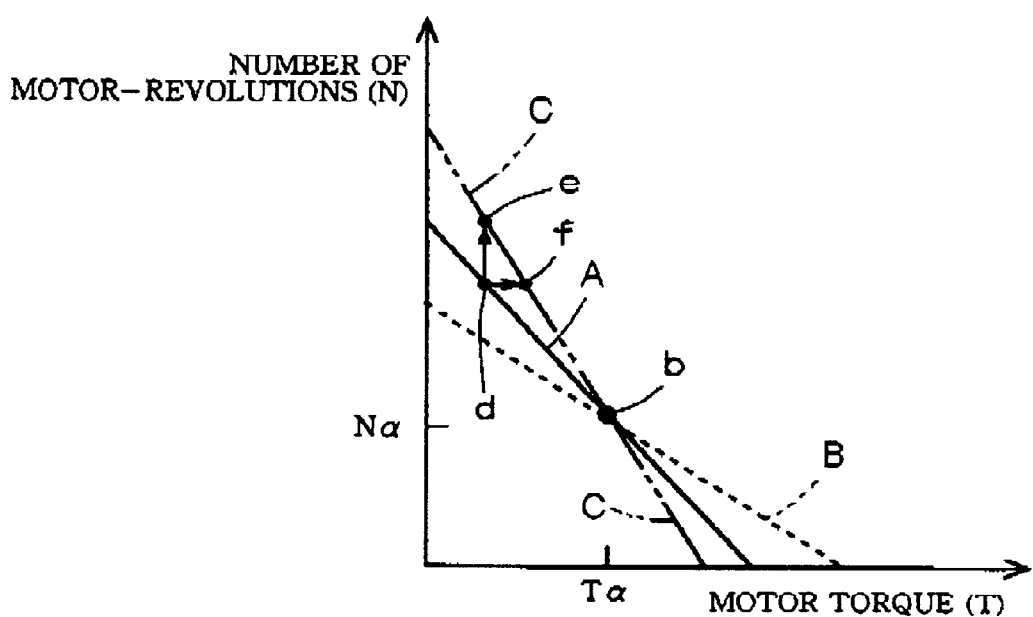
FIG. 3 is a graph showing the motor characteristics when the field is varied.

FIG. 3 illustrates the motor characteristics of the electric motor 6 in relation to three patterns of the fields. In the explanation, the solid line A in FIG. 3 is referred to as a reference characteristic of the electric motor 6. As the field-current of the electric motor 6 on the line A is increased, the field increase in strength, leading to the high-torque characteristics as represented by the broken ling B in FIG. 3. In other words, the motor torque T increases while the number of motor-revolutions N is maintained at a lower and constant value.

On the other hand, if the field-current of the electric motor 6 represented on the line A is decreased, the field decreases in strength, leading to the high-revolution characteristics represented by the chain line C in FIG. 3. In other words, the number of motor-revolutions N increases while the motor torque T is maintained at a constant and lower value.

Next, a description will be given of the manner of changing the field-current to change the motor torque T and the number of motor-revolutions N from the above characteristics of the motor taking a few instances of the motor torque T.

The point b in FIG. 3 represents the intersection of the aforementioned solid line A, broken line B and chain line C, and is defined as the coordinates (Tα, Nα) in the graph of FIG. 3.

In the case of the motor torque T<Tα, when the field current is decreased, the characteristics as represented by the solid line A in FIG. 3 change to those as represented by the chain line C. Changing the field-current in this way allows the motor torque T to remain unchanged but the number of motor-revolutions N to increase. For example, if the motor characteristics is changed from the point d on the line A to the point e on the chain line C, the motor torque T is kept constant but the number of motor-revolutions N increases.

Further, the above change of the field-current allows the number of motor-revolutions N to be kept constant but the motor torque to increase. For example, if the motor characteristics are changed from the point d on the line A to the point f on the chain line C, the number of motor-revolutions N is kept constant but the motor torque T increases.

In the case of the motor torque T>Tα, when the field current is increased, the characteristics change from the line A to the broken line B in FIG. 3. As in the case of the motor torque T<Tα, changing the field-current as described above allows the motor torque T to remain unchanged but the number of motor-revolutions N to increase, and also the number of motor-revolutions N to remain unchanged but the motor torque T to increase.

As described above, concerning the motor torque T, the characteristics of the electric motor 6 changes in the opposite way in the two cases of T>Tα and T<Tα in accordance with the change of the current field. For this reason, the following description uses the case of the motor torque T<Tα.

As described above, the present invention is designed to change the field-current to control the number of motor-revolution N and the motor torque T. For this control, the graph in FIG. 3 is designed as a T-N characteristic table showing the relationship between the number of motor-revolutions N and the motor torque T, which is stored in the aforementioned field-current determination means 13.

The field-current determination means 13 determines the field-current for the electric motor 6 in response to the vehicle-speed signal supplied from the vehicle-speed detection means 9 as follows.

When the vehicle stops or travels at low speeds, the vehicle-speed detection means 9 illustrated in FIG. 1 applies a vehicle-speed signal representing vehicle-speed zero or low-speed travel to the field-current determination means 13. Upon receiving the vehicle-speed signal, the field-current determination means 13 changes the field-current on the basis of the T-N characteristic table to allow the electric motor 6 to have the high-torque characteristics. In other words, if the motor torque is T<Tα, the means 13 applies a field-current control signal for decreasing the field-current to the aforementioned motor-current control means 12.

Hence, the field-current is changed to increase torque of the electric motor 6 while the number of revolutions N of the electric motor 6 remains unchanged. Maintaining the number of revolutions N of the electric motor 6 leads to maintaining the steering response.

When the vehicle travels at high speeds, upon receiving a vehicle-speed signal representing high-speed travel, the field-current determination means 13 changes the field-current on the basis of the T-N characteristic table to allow the electric motor 6 to have the high-revolution characteristics. In other words, if the motor torque is T<Tα, the means 13 applies a field-current control signal for decreasing the field-current to the aforementioned motor-current control means 12.

Hence, the field-current is changed to increase the number of revolutions N of the electric motor 6 while the torque T of the electric motor 6 remains unchanged. Maintaining the torque T of the electric motor 6 leads to maintaining an assist force of the power steering.

In this way, the field-current determination 13 determines the magnitude of the field-current in accordance with the vehicle-speed, and inputs a signal indicative of the magnitude to the motor-current control means 12 illustrated in FIG. 1. Then, the motor-current control means 12 sets the field-current for the electric motor 6.

The motor-current control means 12 further determines the field-current and the torque current to control the output from the electric motor 6.

As described above, it is possible to control the field-current in accordance with the vehicle-speed. Due to this control, when the vehicle stops or travels at low speeds, the assist force of the power steering can be increased while maintaining the steering response. Further, when the vehicle travels at high speeds, the steering response can be improved while maintaining the assist force of the power steering.

Next, a second embodiment of the present invention will be described. The components of the second embodiment the same as or similar to those of the first embodiment are designated by the same reference numerals and have the same functions as those of the first embodiment unless otherwise specified. It is noted that as in the example of prior art the second embodiment is designed to input the vehicle-speed signal to the motor-current control means 12 to allow it to control motor-torque current.

Figure 4:
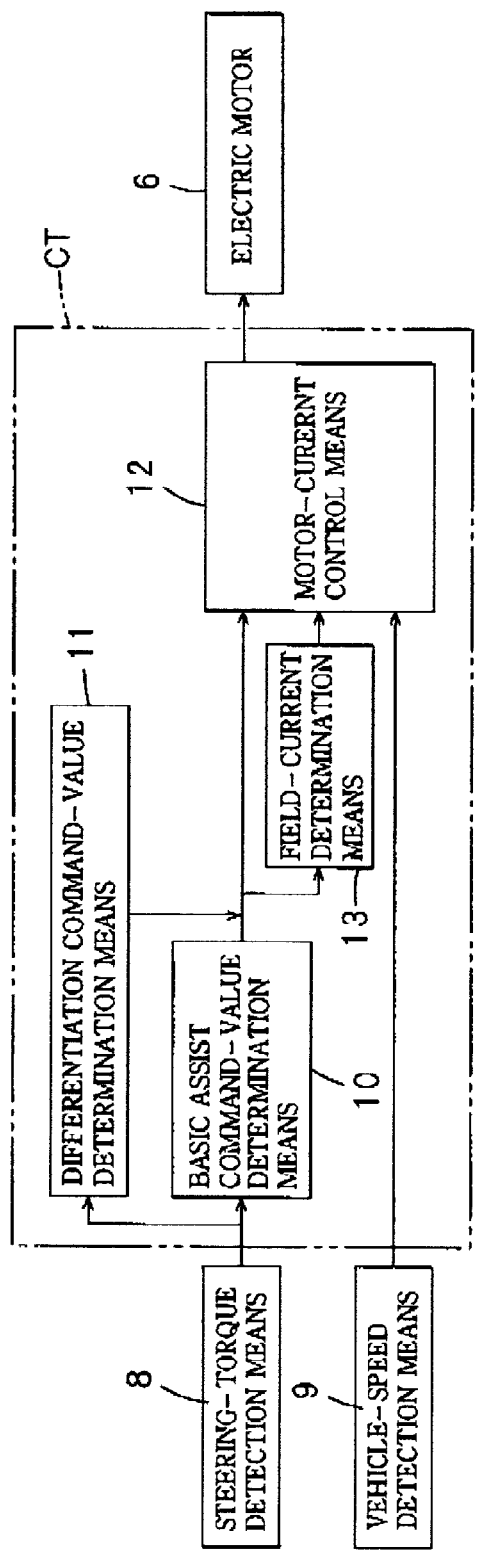
FIG. 4 is a block diagram illustrating a second embodiment.

FIG. 4 is a block diagram of the second embodiment. A controller CT includes a field-current determination means 13 which is configured in the second embodiment as follows.

As in the first embodiment, the field-current determination means 13 stores a T-N characteristic table. In addition, the field-current determination means 13 is designed to change field-current in response to a torque-current control signal resulting from a basic assist command-value signal and a differentiation command-value signal.

In this design, when the torque-current control signal exceeds a threshold value, the means 13 applies a signal for changing the field-current to the motor-current control means 12 to increase the motor torque T. Specifically, if the motor torque is T<Tα, a field-current control signal for decreasing the field-current is input to the motor-current control means 12.

In this case, the field-current is changed to increase the torque T of the electric motor 6 while the number of revolutions N of the electric motor 6 remains unchanged. Maintaining of the number of revolutions N of the electric motor 6 leads to maintaining the steering response.

With the above configuration, the operation in the second embodiment is as follows.

When the driver is quickly and sharply turning the steering wheel W, a large assist force is needed. When the steering wheel W is turned quickly and sharply in this way, the steering-torque signal from the steering-torque detection means 8 is larger, and also the differentiation command-value signal from the differentiation command-value determination means 11 is larger. As a result, the torque-current control signal based on the two command value signals becomes large.

The torque-current control signal is input to the field-current determination means 13. When the torque-current control signal exceeds a threshold value set in the field-current determination means 13, the determination means 13 determines the field-current as follows. The field-current is determined from the T-N characteristic table so as to increase the motor torque T. If the motor torque is T<Tα, the field-current determination means 13 applies the field-current control signal for decreasing the field-current to the motor-current control means 12.

After determining the magnitude of the field-current as described above, the field-current determination means 13 applies a signal indicative of the magnitude to the motor-current control means 12 illustrated in FIG. 4. Then, the motor-current control means 12 sets the field-current for the electric motor 6. At this point, even though the field-current is changed in this way, the aforementioned configuration allows the number of revolutions N of the electric motor 6 to be kept unchanged. Thus, the steering response is also maintained.

The motor-current control means 12 receives a vehicle-speed signal as in the example of prior art, and multiplies the above torque-current control signal by gain according to the vehicle-speed. Then, the motor-current control means 12 determines the field-current and the torque current for controlling the output of the electric motor 6.

As described above, when the steering wheel W is quickly and sharply turned to produce a large steering force, the field-current is controlled so as to increase the motor torque. For this reason, even in an abrupt steering operation, regardless of the vehicle-speed, it is possible to provide a large assist force in addition to maintaining the steering response.

In the second embodiment, the torque-current control signal resulting from the basic assist command value and the differentiation command value is input to the field-current determination means 13. However, a steering-torque signal instead of the torque-current control signal may be input to the field-current determination means 13. If the steering torque signal is defined as an input signal to the field-current determination means 13, as in the second embodiment, the field-current determination means 13 stores a threshold value for the steering torque signal to determine the field-current.

Next, a third embodiment of the present invention will be described. The components of the third embodiment the same as or similar to those of the first embodiment are designated with the same reference numerals and have the same functions as those of the first embodiment unless otherwise specified.

Figure 5:
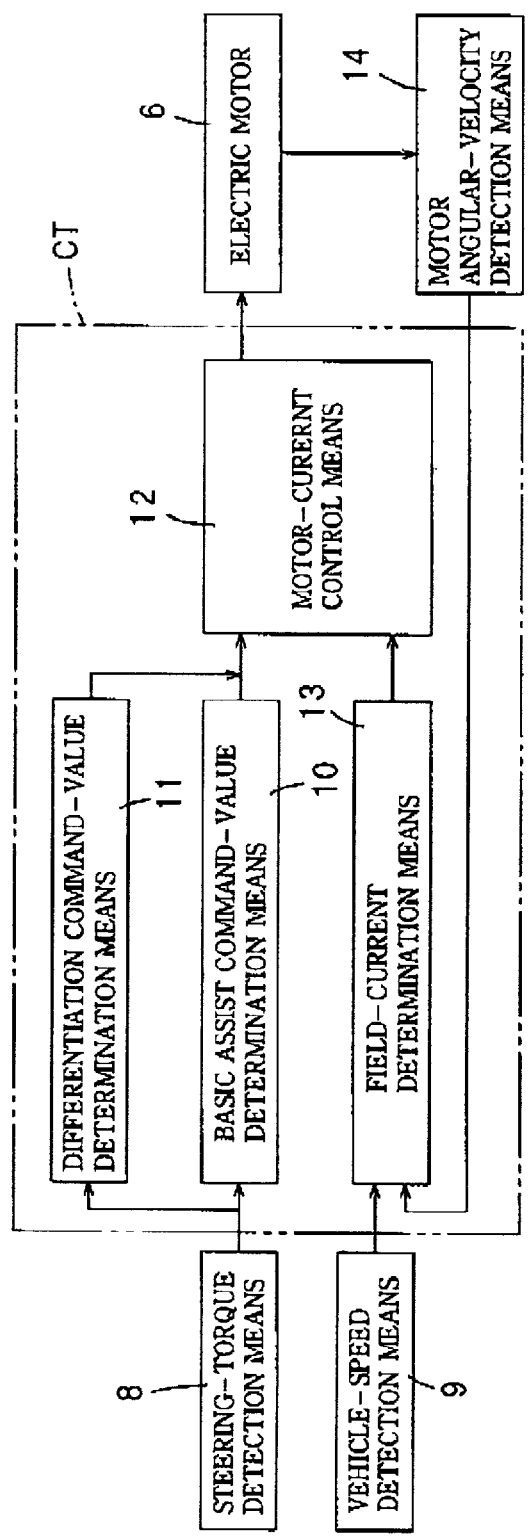
FIG. 5 is a block diagram illustrating a third embodiment.

FIG. 5 is a block diagram of the third embodiment in which a motor angular-velocity detection means 14 is provided in addition to the construction in the first embodiment.

As in the first example, the field-current determination means 13 stores the T-N characteristic table. Additionally, the field-current determination means 13 is designed to change the field-current in response to a motor angular-velocity signal from the motor angular-velocity detection means 14.

In this design, when the motor angular-velocity signal exceeds a threshold value, the detection means 13 applies a signal for changing the field-current to the motor-current control means 12 in order to increase the number of motor-revolutions N. Specifically, if the motor torque is T<Tα, the field-current control means 13 applies a signal for decreasing the field-current to the motor-current control means 12. Here, the field-current is changed to increase the number of motor-revolutions N, resulting in maintaining the motor torque T, and therefore also maintaining the assist force.

As in the first embodiment, the field-current determination means 13 conducts a control for determining the field-current in response to the vehicle-speed signal.

With such a configuration, the third embodiment has the following operation.

When the driver quickly changes the direction of the vehicle, he/she rapidly turns the steering wheel W. At this point, if the motor angular velocity exceeds the threshold value, the aforementioned control allows the number of motor-revolutions N to increase while the motor torque T remains unchanged.

At this point, as described in the first embodiment, the control is performed in accordance with the vehicle speed. In the first embodiment, when the vehicle travels at high speeds, the assist force of the power steering remains unchanged but the number of motor-revolutions N is increased. Hence, an effect in synergy with the control based on the motor angular-velocity signal is provided, which further improves the steering response while the assist force of the power steering remains unchanged.

In the first embodiment, when the vehicle stops or travels at low speeds, the assist force of the power steering is increased while the number of motor-revolutions N remains unchanged. Hence, the field-current determination means 13 determinates, in according to the vehicle-speed and the motor angular-velocity signal, the field-current that provides the motor characteristics of optimizing both the number of motor-revolutions N and the motor torque T.

In this way, when the steering wheel W is rapidly turned for quickly changing the direction of the vehicle, in high speed travel, the assist force of the power steering remains unchanged but the steering response can be further improved.

The third embodiment has a configuration of the motor angular-velocity detection means 14 in addition to the configuration of the first embodiment. As in the third embodiment, the second embodiment may also have the configuration of the motor angular-velocity detection means 14 as follows.

Figure 6:
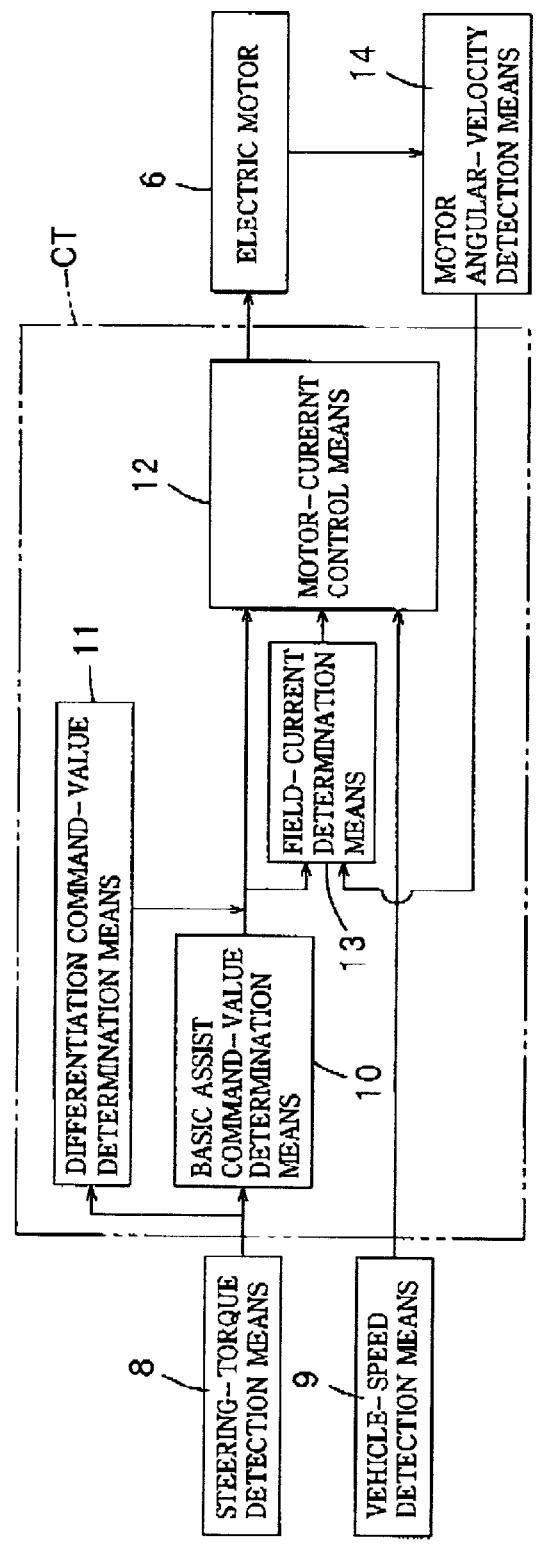
FIG. 6 is a block diagram illustrating a fourth embodiment.

FIG. 6 is a block diagram of a fourth embodiment which includes a motor angular-velocity detection means 14 in addition to the configuration of the second embodiment.

As in the first embodiment, a field-current determination means 13 stores the T-N characteristic table. In addition, as in the third embodiment, the field-current determination means 13 is designed to change the field current in response to a motor angular-velocity signal from the motor angular-velocity detection means 14.

When the motor angular-velocity signal exceeds a threshold value the determination means 13 is designed to apply a signal for changing the field-current to the motor-current control means 12 in order to increase the number of motor-revolutions N. More specifically, if the motor-torque is T<Tα, the field-current control means 13 applies a signal for decreasing the field-current to the motor-current control means 12. Here, the field-current is changed to increase the number of motor-revolutions N so that the motor-torque T remains unchanged, leading to maintaining the assist force.

Based on the second embodiment, when the torque-current control signal exceeds the threshold value, a signal for changing the field-current is input to the motor-current control means 12 to increase the motor torque T. Specifically, if the motor torque is T<Tα, the field-current control signal for decreasing the field-current is put to the motor-current control means 12.

Here, the field-current is changed to increase the torque T of the electric motor 6 while the number of revolutions N of the electric motor 6 remains unchanged. Therefore, the steering response is maintained because the number of revolutions N of the electric motor 6 is maintained.

With the above configuration, when the driver quickly and sharply turns the steering wheel W, through the control according to the second embodiment, it is possible to increase the assist force of the power steering while the steering response is maintained. Further, when the steering wheel W is quickly turned to rapidly change the direction of the vehicle, through the control based on the motor angular-velocity signal, it is possible to improve the steering response while the assist force of the power steering remains unchanged.

In the first embodiment, when the vehicle travels at high speeds, the electric motor 6 rotates at a high speed, but when the vehicle travels at low speeds, the field current is controlled to allow the electric motor 6 to have high torque. However, the design may be inverted for vehicles specific to an auto race. Specifically, the torque is set to be high when the vehicle moves at high speeds, and the torque is set to be low when it moves at low speeds, because when the vehicle moves at high speed such as in a car race, the vehicle is subject to strong air resistance from the direction in which the vehicle is moving, and its tires are strongly pressed on the road surface. Thus, for a vehicle specific to car racing or the like, the torque is set to be high when the vehicle moves at high speeds.

Figure 7:
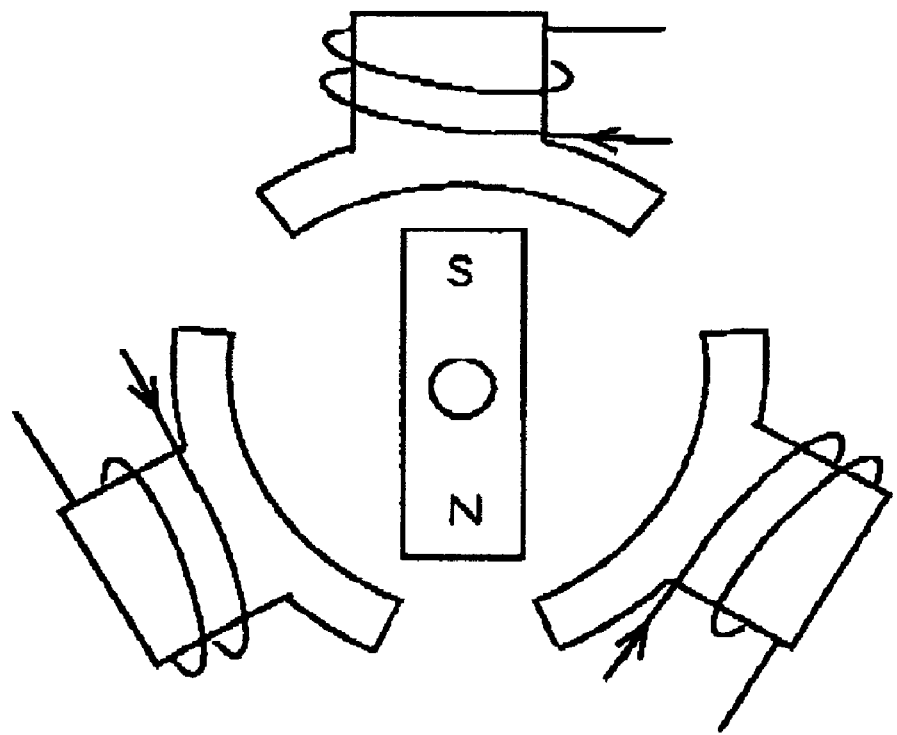
FIG. 7 is a diagram illustrating a brushless motor.
Figure 8:
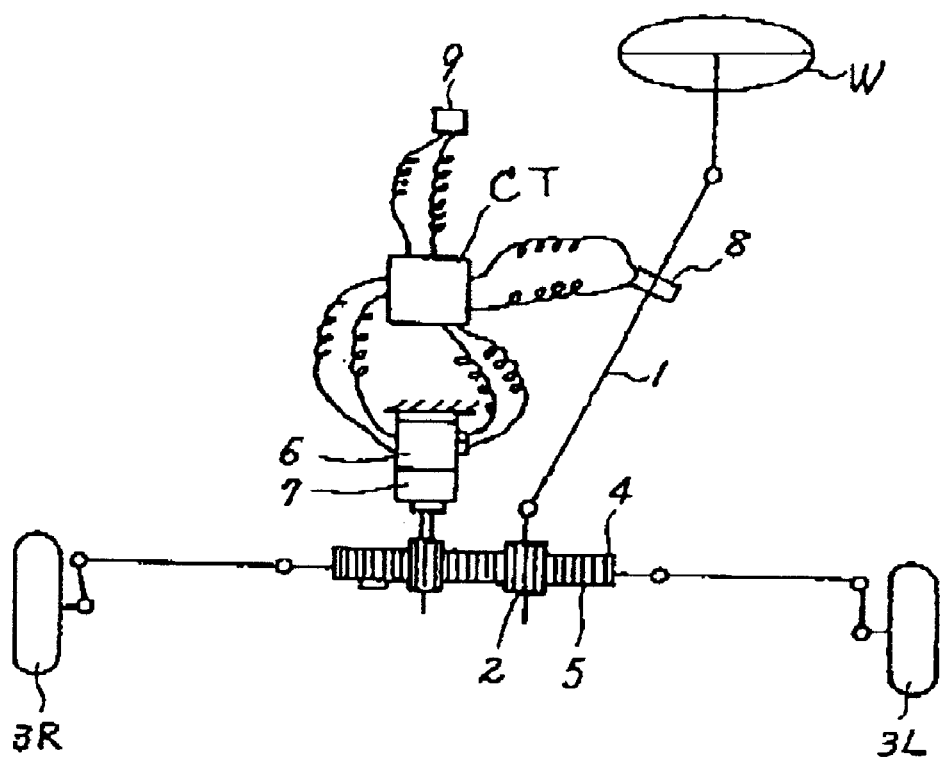
FIG. 8 is a general diagram illustrating a system for controlling electric power steering.
Figure 9:
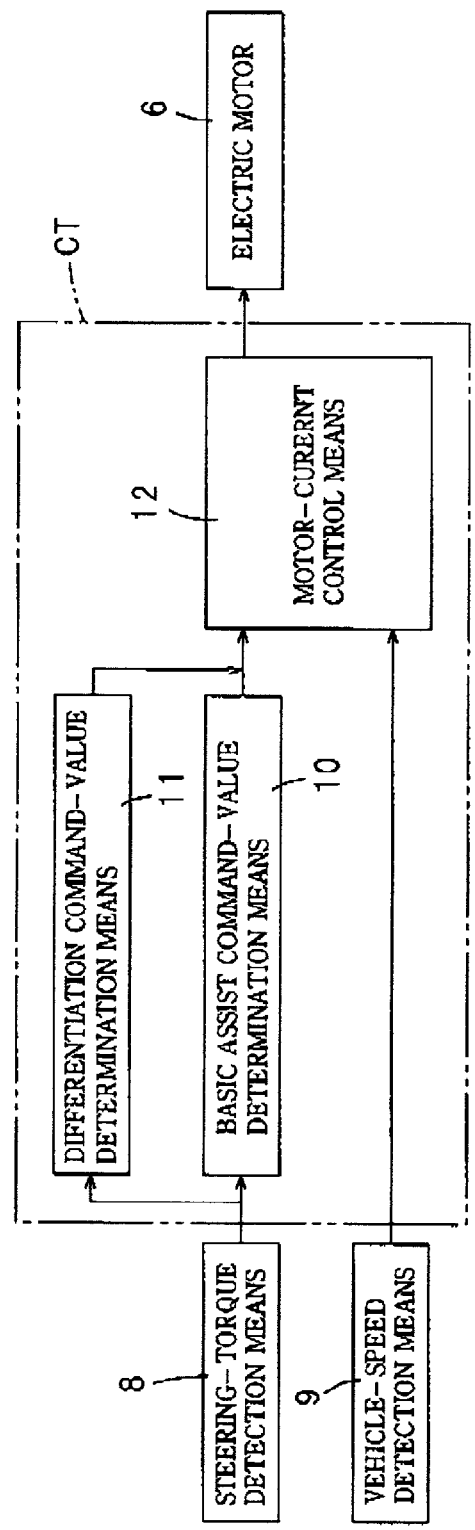
FIG. 9 is a block diagram illustrating an example of the prior art.
Figure 10:
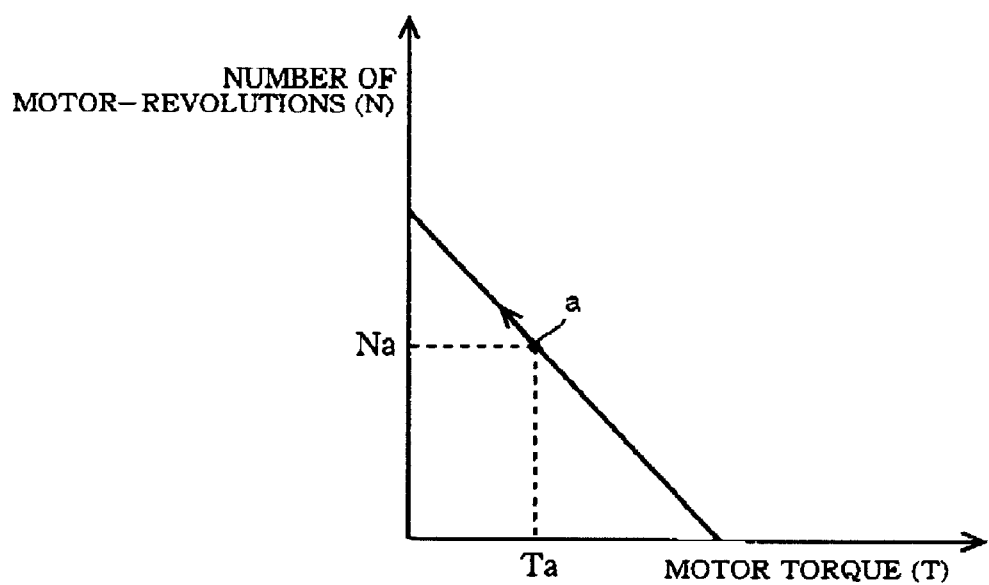
FIG. 10 is a graph showing the motor characteristics in a uniform field.

In all the embodiments, the description has been made of use of a motor with a brush as the. electric motor 6, but a brushless motor can be employed. The brushless motor has a structure as illustrated in FIG. 7 in which a rotor has magnetism, and three conductors on which coils are wound are placed concentrically around the rotor. The brushless motor is able to control the field-current and torque current independently through vector control. In short, the brushless motor can be used in the first to third embodiments to control the field-current as in the first to third embodiments.

I claim:

1. A system for controlling electric power steering comprising:

an electric motor for generating an assist force;

steering-torque detection means for detecting steering torque;

basic assist command-value determination means for determining a basic assist command value on the basis of the steering torque signal;

differentiation command-value determination means for determining a differentiation command value on the basis of the steering torque signal;

vehicle-speed detection means for detecting vehicle speed;

field-current determination means for determining field-current for said electric motor in response to a vehicle-speed signal; and motor-current control means for controlling said electric motor, wherein said motor-current control means controls the output of said electric motor in response to a field-current control signal from said field-current determination means and a torque-current control signal for said electric motor determined on the basis of the basic assist command value and the differentiation command value.

2. The system for controlling the electric power steering according to claim 1, further comprising motor angular-velocity detection means for detecting an angular-velocity of said electric motor, wherein the motor angular-velocity signal is input to said field-current determination means, and the field-current determination means determines field current in response to the motor angular-velocity signal and the vehicle-speed signal.

3. A system for controlling electric power steering comprising:

an electric motor for generating an assist force;

steering-torque detection means for detecting steering torque;

basic assist command-value determination means for determining a basic assist command value on the basis of the steering torque signal;

differentiation command-value determination means for determining a differentiation command value on the basis of the steering torque signal;

field-current determination means for determining field-current for said electric motor in response to a torque-current control signal for said electric motor based on the basic assist command value and the differentiation command value;

vehicle-speed detection means for detecting vehicle speed; and motor-current control means for controlling said electric motor, wherein said motor-current control means controls output of said electric motor in response to a signal resulting from multiplying the torque-current control signal by gain fixed by the vehicle-speed signal, and a field-current control signal from said field-current determination means.

4. The system for controlling the electric power steering according to claim 3, further comprising motor angular-velocity detection means for detecting an angular-velocity of said electric motor, wherein the motor angular-velocity signal is input to said field-current determination means, and the field-current determination means determines field current in response to the motor angular-velocity signal and the torque-current control signal.

* * * * *